United States Patent
Hörler

[11] Patent Number: 4,586,336
[45] Date of Patent: May 6, 1986

[54] EXHAUST GAS TURBOCHARGER WITH ADJUSTABLE SLIDE RING

[75] Inventor: Hansulrich Hörler, Zurich, Switzerland

[73] Assignee: BBC Brown, Boveri & Co., Ltd., Baden, Switzerland

[21] Appl. No.: 487,830

[22] Filed: Apr. 22, 1983

[30] Foreign Application Priority Data

Apr. 29, 1982 [CH] Switzerland .......................... 2609/82

[51] Int. Cl.$^4$ ........................ F01D 17/08; F02B 37/12
[52] U.S. Cl. ...................................... 60/602; 415/158
[58] Field of Search ............... 415/158, 157, 148, 151; 60/600, 601, 602, 603

[56] References Cited

U.S. PATENT DOCUMENTS

| | | | |
|---|---|---|---|
| 2,861,774 | 11/1958 | Buchi | 60/602 |
| 2,996,996 | 8/1961 | Jassniker | 415/158 |
| 4,415,307 | 11/1983 | Fortmann | 415/158 X |
| 4,416,583 | 11/1983 | Byrns | 415/158 |

FOREIGN PATENT DOCUMENTS

| | | | |
|---|---|---|---|
| 1428192 | 3/1969 | Fed. Rep. of Germany | 415/158 |
| 2633587 | 2/1978 | Fed. Rep. of Germany | 60/602 |
| 20213 | 2/1979 | Japan | 415/158 |
| 1138941 | 1/1969 | United Kingdom | 415/158 |

*Primary Examiner*—Michael Koczo
*Attorney, Agent, or Firm*—Oblon, Fisher, Spivak, McClelland & Maier

[57] ABSTRACT

In an exhaust gas turbocharger with a radial or axial turbine and an at least partially radial flow turbine nozzle ring (8), a movable slide ring (2) makes possible an infinite adjustment of the turbine inlet cross-section. The movement of the slide ring (2), which slides between nozzle ring (8) and rotor blading (1), occurs by means of an axial displacement. The front edge around which the gas flows is shaped to conform with the flow in order to avoid downstream separations. With radial turbines, the inlet flow angle to the turbine rotor blading remains approximately constant over the whole control range. In consequence, the shock loss at the turbine rotor blading substantially disappears. The infinite adjustment of the turbine inlet cross-section results in an improved part load behavior of the supercharged engine because the air quantity supplied to the engine is matched to the combustion conditions and smokeless operation is obtained over the whole rotational speed range.

9 Claims, 6 Drawing Figures

EXHAUST GAS TURBOCHARGER WITH ADJUSTABLE SLIDE RING

FIELD OF THE INVENTION

The invention concerns an exhaust gas turbocharger for internal combustion engines with a turbine which is provided with a slide ring movable in the axial direction for altering the turbine inlet flow cross-section.

BACKGROUND OF THE INVENTION

At part load on the engine, the exhaust gas quantity decreases, which, with an unaltered turbine inlet cross-section, leads to a reduction in the boost pressure. In consequence, the engine receives too little air so that the exhaust gas temperature and the danger of incomplete combustion increase. In order to be able to travel in this condition without malfunctioning, it is necessary to be able to adapt the turbine inlet cross-section while running so that a reasonably constant boost pressure and smokeless operation over the whole control range are maintained.

The slide ring arrangement described above is limited to radial turbines. The recognisably thin slide ring is provided with an uncontoured end-surface. If the ring protrudes into the flow duct during operation, a strong flow separation with associated losses is unavoidable.

OBJECT OF THE INVENTION

The objective of the invention is to create an exhaust gas turbocharger with a gas turbine which is infinitely adjustable over the whole speed range without adversely affecting the vane parts guiding the flow.

SUMMARY OF THE INVENTION

In accordance with the invention, the foregoing objective is attained in a supercharger having a slide ring movable in the axial direction by shaping the slide ring end surface so that the radial inlet flow is deflected almost without separation into an outlet flow which is substantially axial.

ADVANTAGES OF THE INVENTION

The advantages obtained by means of the invention are mainly to be seen in the fact that a simple, cost-effective and operationally reliable possibility of control is created which is effective without subdivision of the exhaust gas inlet duct and the turbine rotor blading. A further advantage in the case of radial turbines consists in the fact that the shock loss at the leading edges of the turbine rotor blading substantially disappears because the inlet flow angle to the turbine rotor blading remains constant over the whole control range. Due to the fact that the trailing edges of the turbine nozzle ring lie at least partially on a cylindrical surface, the invention can be applied to both radial turbines and axial turbines.

BRIEF DESCRIPTION OF THE DRAWINGS

Exemplary embodiments of the subject of the invention are shown in a simplified manner in the drawing in which.

The same parts are given the same reference numbers in all the figures. The flow direction of the exhaust gas is indicated by arrows. The position of the slide ring at engine full load is indicated by A and that at minimum load by B.

DETAILED DESCRIPTION OF THE PRESENTLY PREFERRED EMBODIMENTS

Figure 1:
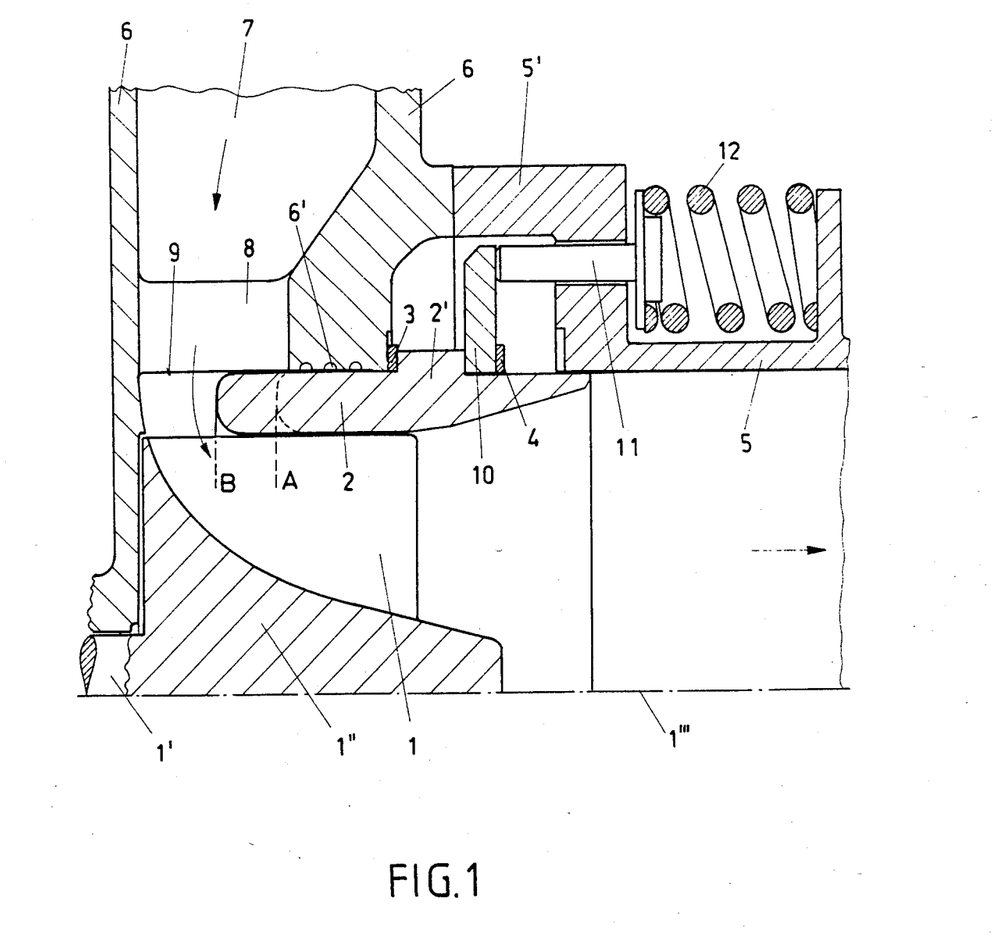
FIG. 1 shows a radial turbine of an exhaust gas turbocharger in a partial longitudinal section.

FIG. 1 shows the upper half of a radial turbine of an exhaust gas turbocharger with a gas inlet casing 6 which is connected to an exhaust gas collector pipe (not shown) of a supercharged engine. An inlet duct 7 and a turbine nozzle ring 8 consisting of a plurality of spaced guide vanes are located in the gas inlet casing 6. The turbine shaft 1' is supported in the gas inlet casing 6 and carries the hub 1" equipped with rotor blading 1. The exhaust pipe 5 is connected to the gas inlet casing 6 by means of a flange 5'.

The trailing edges 9 of the radial flow nozzle ring 8 lie on an imaginary cylinder coaxial with the turbocharger axis 1''', i.e. in the projection onto the plane of the drawing, the trailing edges 9 run parallel to the axis. A slide ring 2 is located between the trailing edges 9 of the nozzle ring 8 and the leading edges of the rotor blading 1. The slide ring 2 can be displaced axially in conjunction with an annular plate 10 and a pressure piston 11 against the bias force of helical springs 12.

For cooling purposes, the springs 12 are located outside the exhaust pipe 5. The number of springs 12 and pressure pistons 11, which are evenly distributed around the periphery, depends on the size of the turbocharger.

The slide ring 2 is guided by the gas inlet casing 6; there is a clearance between the sliding ring 2 and the exhaust pipe 5. The guide on the inlet casing 6 is provided with a labyrinth 6', in order to prevent the escape of exhaust gas into the atmosphere. In order to retain the axial end position, the slide ring 2 is provided with a shoulder 2' at its outer periphery which, depending on the position, is in contact with the inlet casing 6 or the flange 5' of the exhaust pipe 5. Shim washers 3 and 4 of variable thickness are provided for adaptation to a particular engine.

In the example shown, the external contour of the turbine rotor blading 1 is straight and parallel to the axis, which seems rather unusual for a radial turbine. Using this simple construction, however, efficiencies can be obtained which are almost as good as those otherwise obtained with conventional contours. The slide ring 2 takes up the whole width of the gap formed between the nozzle ring 8 and the rotor blading 1. It slides with its cylindrical outer and inner surfaces directly, on the one hand, along the guide vane edges 9 and, on the other, with the necessary operating clearance along the outer edges of the rotor blading 1. The end surface of the slide ring 2 protruding into the gap mentioned is rounded to conform with the flow. In the present connection, this means that the end surface of the slide ring 2 and its neighboring surface facing the turbine rotor blading 1 are so shaped that the radial inlet flow in the projection onto the drawing plane is deflected almost without separation into a substantially axial outlet flow in the same projection. It is obvious that the inlet flow edge of the slide ring 2 facing the nozzle ring 8 is also correspondingly rounded. The slide ring 2 rear edge is tapered so that the outlet surface of the rotor blading 1 is always matched to the exhaust pipe inner surface.

On the gas side, the turbocharger operates as follows: The exhaust gas flows through the gas inlet duct 7 and the turbine nozzle ring 8 to the turbine rotor blading 1, in which it expands giving up power and is subsequently expelled through the exhaust pipe 5 into the atmosphere.

Because of the expansion of the exhaust gas, a pressure difference occurs before and after the turbine rotor blading 1. The pressure difference creates an axial force which acts on the slide ring 2. The axial force, which acts on the end surface of the slide ring 2 in the gap between nozzle ring 8 and the rotor blading inlet because of the exhaust gas pressure difference, compresses the helical springs 12 via the annular plate 10 and the pressure pistons 11 and is in equilibrium with the spring force.

At full load on the engine, the slide 2 is in the position A. The governing end surface of the slide ring 2 is determined by the thickness of the slide ring in the radial direction and its diameter. The characteristics and prestress necessary for the springs 12 are determined by the length and width of the control region in the engine characteristic diagram.

If the load on the engine is reduced, the exhaust gas pressure before the turbine decreases and with it the axial force acting on the end surface of the slide ring 2. The compressed springs 12 expand and displace the slide in the direction of the end position B until a state of equilibrium is attained between the gas force and the spring force. The slide ring 2 now protrudes into the flow duct and thus reduces the turbine inlet cross-section. An important feature here is that the outlet angle from the turbine nozzle ring 8 remains approximately constant over the whole speed range. Because of this, the shock loss at the leading edges of the turbine rotor blading 1 is to a large extent avoided. When the engine is at rest or on minimum load, the slide 2 is in the position B.

Figure 2:
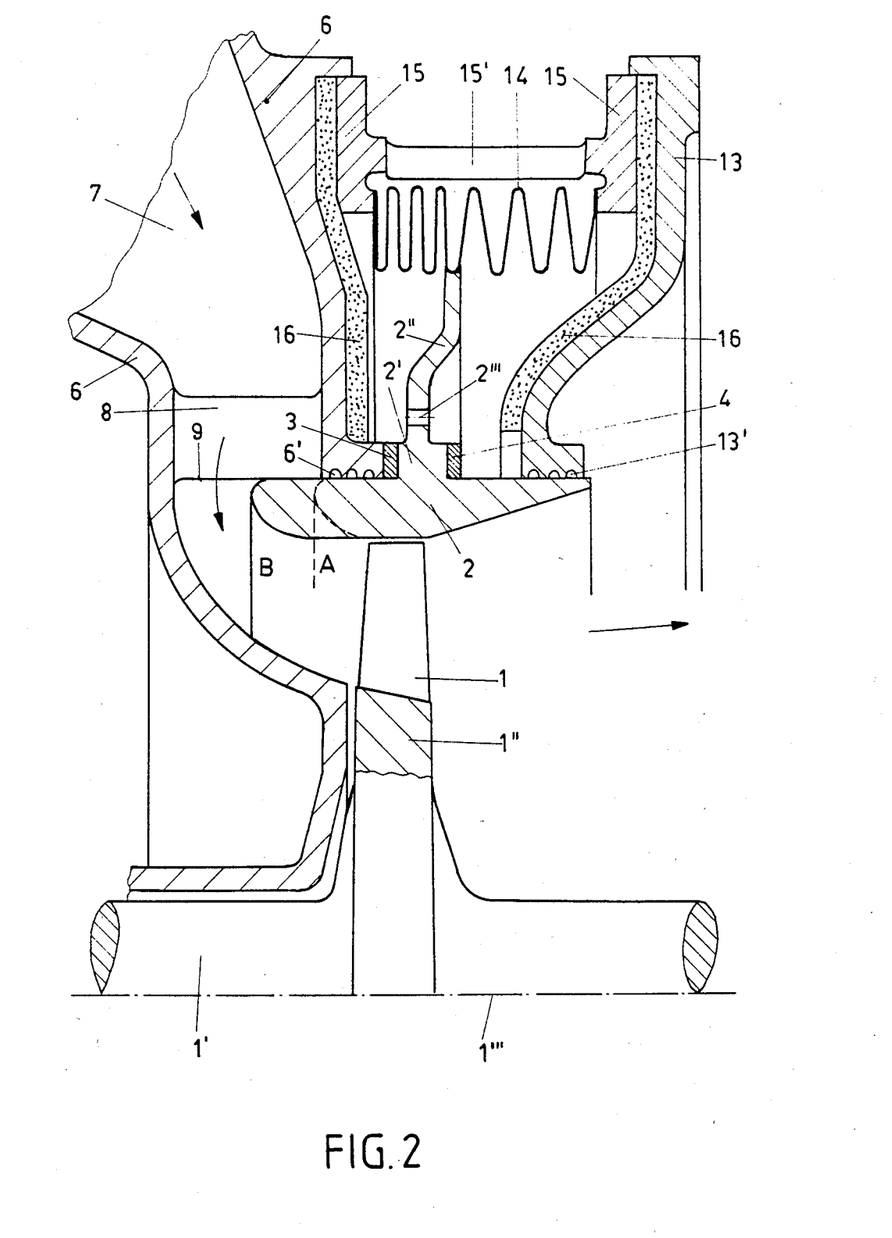
FIG. 2 shows an axial turbine of an exhaust gas turbocharger in a partial longitudinal section.

In FIG. 2, an axial turbine of an exhaust gas turbocharger is provided with a radial flow nozzle ring 8. The gas inlet casing 6 is here connected with a gas outlet casing 13 by means of a distance ring 15, which is provided with openings 15' in its cylindrical part. A metal bellows 14 is connected to the slide ring 2 and acts as a spring biasing the slide ring 2 to the left in FIG. 2. The bellows 14 is arranged in a gas-tight manner inside the distance ring 15. The openings 15' in the distance ring 15 are so designed that effective cooling of the metal bellows 14 by the ambient air is guaranteed. The slide ring 2 is arranged between the radial turbine flow nozzle ring 8 and the axial flow turbine rotor blading 1 so that it can be displaced in the axial direction. It is solidly connected, for example welded, with the middle of the metal bellows at the shoulder 2' by means of a circular plate 2". The plate 2", which is thus a constituent part of the slide ring 2, is provided with pressure balance holes 2'''. In the position B of the slide ring 2, the shoulder 2' is in contact with the inlet casing 6 via the shim washer 3 whereas, in the position A, it is in contact with the gas outlet casing 13 via the shim washer 4. In order to reduce the heat transfer, the gas inlet casing 6 and the gas outlet casing 13 are provided with heat insulation layers 16.

The slide ring 2 is guided on one side on the gas inlet casing 6 and on the other on the gas outlet casing 13. The guide of the slide ring 2 is provided with a labyrinth 6' on the gas inlet casing 6 and a labyrinth 13' on the gas outlet casing 13. By this means, direct escape of the exhaust gas into the exhaust is prevented.

The operation of the slide ring occurs as in FIG. 1 by means of the axial force which, because of the exhaust gas pressure difference before and after the turbine blading 1, acts on the end surface of the slide ring 2. This force is transmitted to the metal bellows 14 via the shoulder 2' and the circular metal plate 2" and is in equilibrium with the spring force of the metal bellows. The metal bellows 14 ensures gas-tightness, on the one hand, and the necessary spring force and bias for the desired transition behaviour of the control system, on the other.

Figure 3:
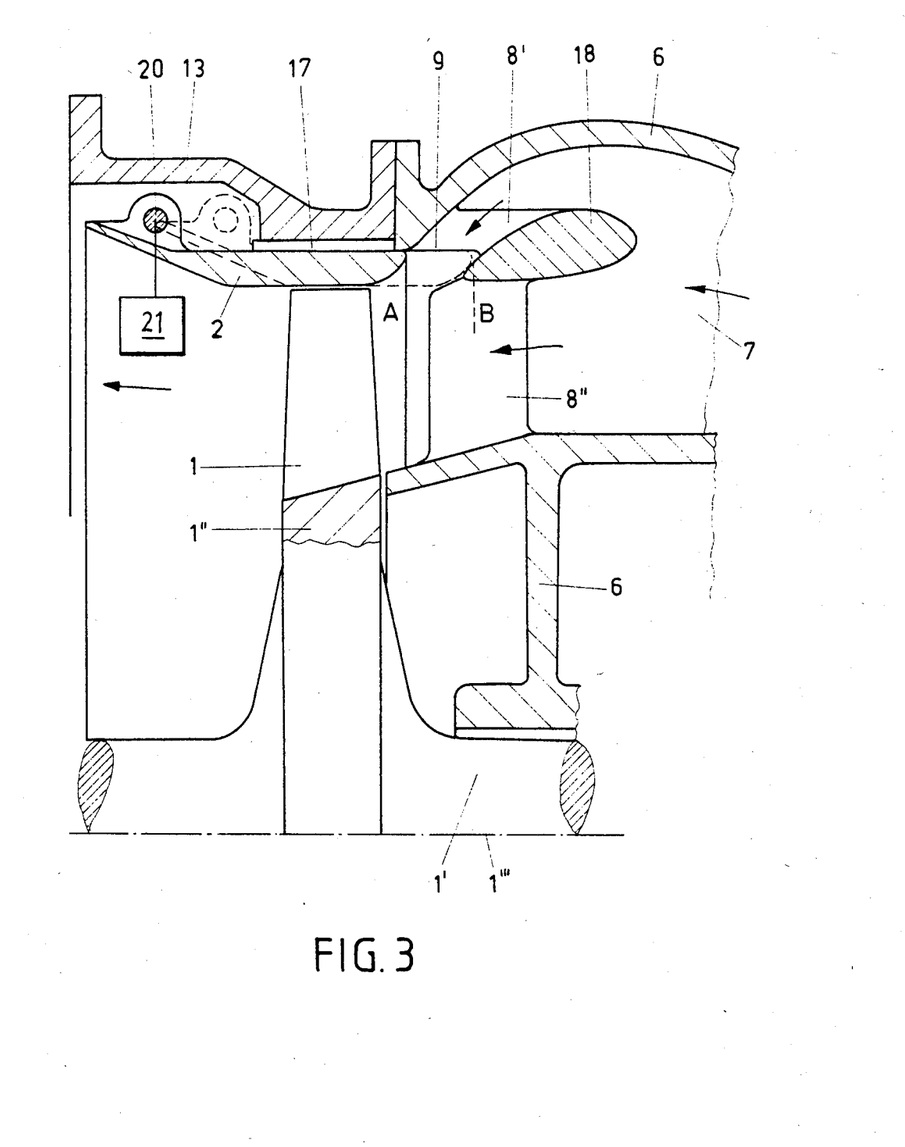
FIG. 3 shows a further axial turbine with a double-flow nozzle ring.

In FIG. 3, an axial turbine is provided with a double-flow nozzle-ring. The gas inlet casing 6 contains the inlet flow duct 7 and a double-flow nozzle ring 8', 8". The approximately radial flow (depending on the embodiment) part 8' of the turbine nozzle ring is separated from the axial part 8" by a profile ring 18. The gas inlet casing 6 is directly connected to the gas outlet casing 13. The latter becomes an exhaust pipe, which is not shown.

The slide ring 2 is guided in the gas outlet casing 13 by a steep thread 17. The slide ring 2 takes up the whole width of the gap between the radial part 8' of the turbine nozzle ring and the rotor blading 1. It can be moved with its cylindrical outer and inner surfaces on the guide vane edges 9, on the one side, and on the outer edges of the rotor blading 1, on the other side. When the slide ring 2 is rotated by means of a traction rod 20, the slide ring 2 is displaced in the axial direction and so makes possible a stepless closing or opening of the radial part of the nozzle ring 8'.

The traction rod 20 is so designed that, when displaced in its axial direction, it is also displaced sideways, i.e. in the axial direction of the turbocharger. The maximum sideways displacement is equal to the distance between the positions A and B of the slide ring 2. The maximum rotation depends on the maximum displacement of the slide and on the angle of the thread 17. Thus at a thread angle of 45°, for example, the tangential displacement of the traction rod 20 is equal to the axial displacement of the slide ring 2.

The traction rod 20 is connected to a control mechanism, which is not shown indicated schematically at 21. This mechanism is operated by one or several engine parameters, such as, for example, pressure, temperature, rotational speed or load. For example, a centrifugal governor of conventional construction driven by the engine can be used for this purpose. The centrifugal governor must be so coupled to the slide ring 2 that the slide ring 2 is in the position B at the engine minimum rotational speed and in the position A at full speed. The traction rod 20 and the control mechanism 21 must also be capable of displacing the slide ring 2 against the force which acts on the end surface of the slide ring because of the exhaust gas pressure difference before and after the turbine rotor blading.

At full load on the engine, the slide ring 2 is in the position A and there is full flow through both parts of the nozzle ring 8', 8". At part load, the axial part 8" of the nozzle ring receives full flow and the radial part 8' receives part flow because of the stepless displacement of the slide ring 2. At minimum engine load, the slide ring 2 is in the position B and the radial part 8' of the nozzle ring is closed.

Figure 4:
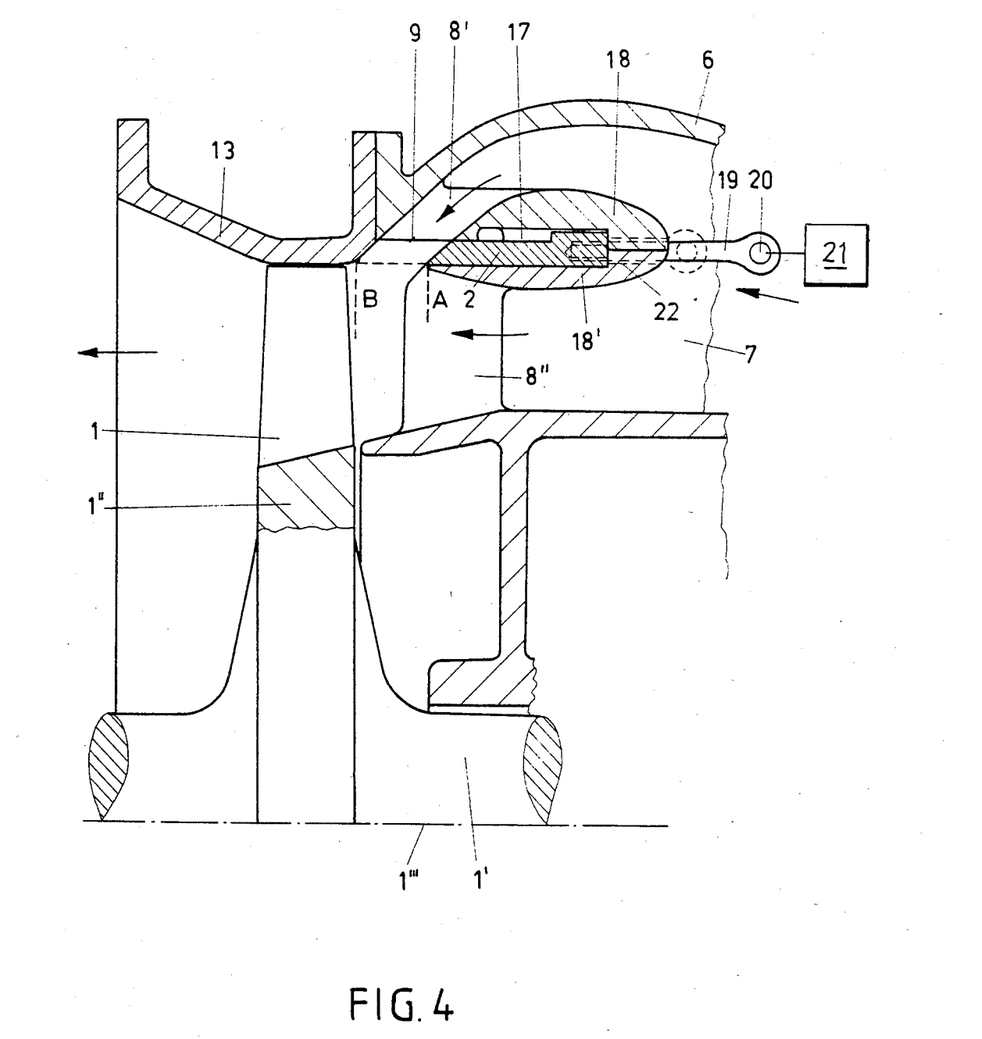
FIG. 4 shows a modification of the arrangement of FIG. 3.

The turbocharger of FIG. 4 differs from that of FIG. 3 in that the slide ring 2 is accomodated within the profile ring 18, thus providing an inlet duct with more favourable flow conditions.

The inner part 18' of the resulting two-part profile ring 18 bounds the radially outer part of the axial flow part 8'' of the nozzle ring 8. For displacement purposes, the radially outer periphery of the slide ring 2 and the opposite radially inner part of the upper part of the profile ring 18 are provided with a steep thread 17.

The displacement of the slide ring 2 occurs via a traction rod 20 by means of a drive lever 19, which is solidly connected to the slide ring 2. The drive lever 19 is guided in a tangential gap 22 between the profile ring upper part and the profile ring lower part 18'. The gap 22 extends in the peripheral direction by an amount which is determined by the angle of the steep thread 17 and the maximum displacement of the slide ring 2. The traction rod 20 is, as in the example shown in FIG. 3, connected to a control mechanism, which is not shown indicated schematically at 21.

The advantage of this solution may be particularly seen in the fact that even at part load, the radially outer parts of the rotor blading 1 are subjected to a flow proportion which has not had a sharp deflection forced on it.

Figure 5:
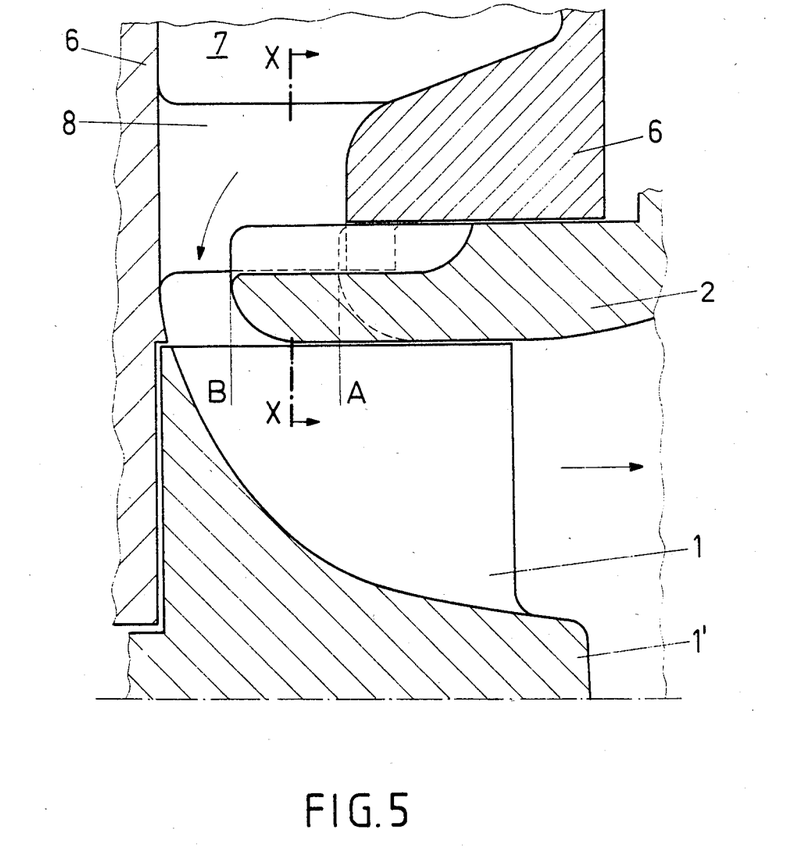
FIG. 5 shows a modification of the radial turbine of FIG. 1.
Figure 6:
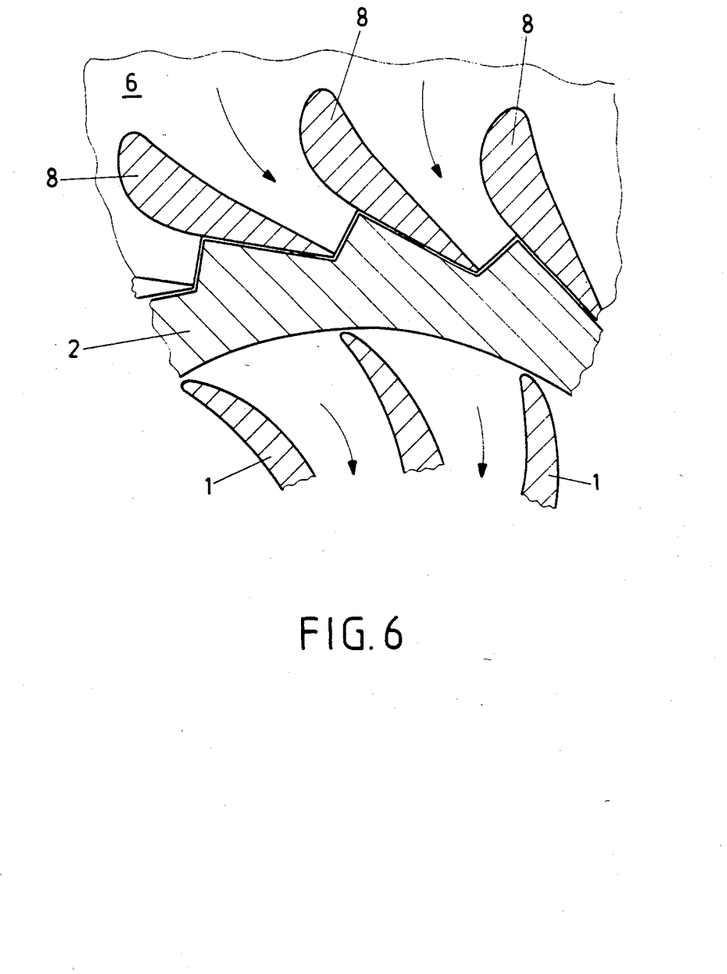
FIG. 6 shows a cross-section along line X—X in FIG. 5.

In the embodiment shown in FIGS. 5 and 6, the slide ring 2 has a saw-tooth profile in section at the external surface on the parts facing the gas flow, the pitch spacing between the saw-tooth shaped teeth corresponding to the pitch spacing between of the spaced guide vanes in the turbine nozzle ring 8, 8'. The surface of the teeth facing the flow is approximately at right angles to the neighboring guide vane surfaces and is rounded to the end surface of the slide ring to avoid flow separations. The passage through the casing 6 is also saw-tooth shaped and cut out with the smallest possible leakage gap to the slide ring 2.

The advantage of this solution consists in the fact that the blockage effect of the slide ring 2 is applied at the narrowest point of the flow duct, thus improving the effect of the slide ring 2 and the part load efficiency of the turbocharger.

What is claimed is:

1. An exhaust gas turbocharger for an internal combustion engine, said exhaust gas turbocharger comprising:
   (a) a turbine having rotary blades, said rotary blades defining a cylindrical volume as they rotate;
   (b) an at least partially radial-flow turbine nozzle ring comprising a plurality of circumferentially spaced guide vanes sized, shaped, and positioned to cause exhaust gas to flow therebetween in a direction, said plurality of circumferentially spaced guide vanes having downstream edges which lie on an imaginary cylinder which is spaced outwardly from the cylindrical volume defined by the rotary motion of said rotary blades; and
   (c) a slide ring movable in the axial direction for altering the turbine inlet flow cross-section, said slide ring extending upstream between said nozzle ring and said rotary blades and being axially movable along the downstream edges of said guide vanes, said slide ring extending downstream beyond said rotary blades and having a radial internal contour which is closely spaced from the radially outer edges of said rotary blades over the entire axial travel of said slide ring and which forms the radial wall of a flow duct for exhaust gas downstream of said rotary blades.

2. An exhaust gas turbocharger as recited in claim 1 and further comprising means for biasing said slide ring against the force acting on the upstream end of said slide ring created by the difference in pressure of the exhaust before and after said rotary blades, whereby the axial positioning of said slide ring occurs automatically.

3. An exhaust gas turbocharger as recited in claim 1 and further comprising means for adjusting the axial position of said slide ring as a function of an engine parameter.

4. An exhaust gas turbocharger as recited in claim 1 wherein:
   (a) the surface of said slide ring adjacent to said nozzle ring is saw-toothed shaped;
   (b) the spacing between the saw-teeth on said slide ring corresponds to the spacing between the spaced guide vanes in said nozzle ring; and
   (c) the surfaces of said saw-teeth on said slide ring facing the gas flow are substantially perpendicular to the direction of flow of the exhaust gas.

5. An exhaust gas turbocharger as recited in claim 4 and:
   (a) further comprising a gas inlet casing;
   (b) wherein said slide ring is axially movable along the radially inner surface of said gas inlet casing; and
   (c) wherein said gas inlet casing is provided with saw-teeth corresponding to the saw-teeth on said slide ring.

6. An exhaust gas turbocharger as recited in claim 1 wherein the surface of said slide ring adjacent to said nozzle ring comprises a plurality of saw-teeth shaped so that they project in between the circumferentially spaced guide vanes in said nozzle ring and so that one surface of each of said saw-teeth is in sliding engagement with the leading surface of an associated one of said guide vanes.

7. An exhaust gas turbocharger as recited in claim 6 wherein the surfaces of said saw-teeth on said slide ring facing the gas flow are substantially perpendicular to the direction of flow of the exhaust gas.

8. An exhaust gas turbocharger for an internal combustion engine, said exhaust gas turbocharger comprising:
   (a) a turbine having rotary blades, said rotary blades defining a cylindrical volume as they rotate;
   (b) at at least partially radial-flow turbine nozzle ring comprising a plurality of circumferentially spaced guide vanes sized, shaped, and positioned to cause exhaust gas to flow therebetween in a direction, said plurality of circumferentially spaced guide vanes having downstream edges which lie on an imaginary cylinder which is spaced outwardly from the cylindrical volume defined by the rotary motion of said rotary blades to define a gas flow passage therebetween;
   (c) a slide ring which is axially movable along the downstream edges of said guide vanes into said gas flow passage and which takes up the whole radial width of said gas flow passage, said slide ring having a radial forward surface against which fluid in said gas flow passage acts to bias said slide ring out of said gas flow passage, said slide ring extending downstream beyond said rotary blades and having a radial internal contour which is closely spaced from the radially outer edges of said rotary blades over the entire axial travel of said slide ring and which forms the radial wall of a flow duct for exhaust gas downstream of said rotary blades; and (d) spring means which bias said slide ring into said gas flow passage against the force applied to said slide ring by the fluid pressure in said gas flow passage, whereby said slide ring automatically varies the effective cross-sectional area of said gas flow passage in response to changes in the fluid pressure in said gas flow passage.

9. An exhaust gas turbocharger for an internal combustion engine as recited in claim 8 wherein the upstream and downstream faces of said slide ring are rounded to conform to the flow of gases through said gas flow passage.

* * * * *